United States Patent [19]

Reuschenbach et al.

[11] 4,445,671
[45] May 1, 1984

[54] GAS SPRING INCLUDING HYDRAULIC LOCKING MEANS

[75] Inventors: Hermann Reuschenbach, Rossbach; Egon Sentinger, Koblenz, both of Fed. Rep. of Germany

[73] Assignee: Stabilus GmbH, Koblenz-Neuendorf, Fed. Rep. of Germany

[21] Appl. No.: 311,470

[22] Filed: Oct. 14, 1981

[30] Foreign Application Priority Data

Oct. 28, 1980 [DE] Fed. Rep. of Germany ....... 3040483

[51] Int. Cl.³ .......................... F16F 9/06; A47B 9/10
[52] U.S. Cl. .............................. 267/64.12; 267/64.15; 267/114; 248/404; 248/550; 248/566; 188/283; 188/300; 108/144
[58] Field of Search ............... 188/283, 285, 299, 300, 188/314, 315, 318, 319, 320, 151 A, 353; 267/15 A, 64.12, 64.15, 113, 114, 127, 130, 137, DIG. 1, DIG. 2; 91/435, 446; 70/174, 175, 176; 248/404, 550, 566, 631; 137/461, 501; 108/144, 146

[56] References Cited

U.S. PATENT DOCUMENTS

| | | | |
|---|---|---|---|
| 2,239,112 | 4/1941 | Nickelson | 188/318 |
| 2,691,503 | 10/1954 | Bigelow | 248/404 |
| 2,853,159 | 9/1958 | Kuhn, Jr. | 188/314 |
| 2,953,122 | 9/1960 | Zagar | 267/114 |
| 3,711,054 | 1/1973 | Bauer | 248/631 |
| 3,880,465 | 4/1975 | Scheben | 248/631 |
| 3,991,863 | 11/1976 | Lee | 188/299 |
| 4,074,887 | 2/1978 | Hale | 248/631 |
| 4,153,237 | 5/1979 | Supalla | 267/64.15 |

FOREIGN PATENT DOCUMENTS 1554251 3/1970 Fed. Rep. of Germany .
2513128 9/1976 Fed. Rep. of Germany .

Primary Examiner—Douglas C. Butler
Assistant Examiner—R. R. Diefendorf
Attorney, Agent, or Firm—Brumbaugh, Graves, Donohue & Raymond

[57] ABSTRACT

A gas spring for height adjustment of drawing-tables or the like includes an arrangement for hydraulically locking the gas spring against sudden collapse due to overloading or loss of internal gas pressure. The hydraulic locking mechanism includes a pressure responsive valve which operates, in response to an excess pressure differential between the gas spring cavity and the pressurized gas chamber, either to prevent flow of the hydraulic locking medium out of the cylinder cavity or to restrict such flow to a slow, safe rate.

11 Claims, 4 Drawing Figures

GAS SPRING INCLUDING HYDRAULIC LOCKING MEANS

BACKGROUND

1. Field of the Invention

The present invention relates to a hydraulically lockable gas spring for continuous height adjustment of objects, particularly of drawing-tables.

2. The Prior Art

It is known in the prior art to provide hydraulically lockable devices in the support columns or legs of drawing tables or other objects which carry weight, e.g., chairs. Such prior art devices typically include a liquid-filled cylinder, a piston rod sealingly guided for movement inward and outward of said cylinder and being connected to a piston within the cylinder. The piston rod is connected to the object to be supported, and the cavity of the cylinder is connected to a second liquid chamber, which is subject to the pressure of a pressurized gas contained in a gas chamber, via an externally controlled locking member.

A gas spring of the above type including hydraulic locking means has been known from German Offenlegungsschrift No. 1,554,251. The hydraulic locking is effected by the bottom valve which interconnects the cylinder cavity filled with liquid and the second chamber filled with liquid. A chamber filled with pressurized gas and provided adjacent the second liquid chamber exerts a force on the piston rod when the bottom valve is opened which substantially corresponds to the weight which is exerted on the gas spring by the object to be vertically adjusted. It is a disadvantage of this construction that an increase in weight of the member to be vertically adjusted—for example, by heavy articles deposited on a drawing-table—causes the member which is vertically adjusted suddenly to slide down. In particular, that is the case with vertically adjustable drawing-tables whose weight is increased by additional appliances, so that the user can be exposed to danger.

In connection with drawing-tables which are in the form of a one-column frame, it has been known from German Auslegeschrift No. 2,513,128 to prevent the danger to the user by providing additional mechanical brakes to prevent a release of the locking means in case of greatly increased weight of the drawing-table plate, and also to lock the gas spring mechanically in the case of low gas pressure in the spring. Such a combination of a gas spring, a mechanical brake, and a safety means preventing drop of the plate is very complex in manufacture and moreover requires a precise adjustment in order to adapt the moment of response of the drop brake to the respective weight of the drawing-table and to compensate for production tolerances.

SUMMARY

It is an object of the present invention to provide a gas spring including hydraulic locking means which is suited in particular for vertical adjustment of drawing-tables and which is simple to manufacture.

It is a further object of the invention to provide such a spring which is a well-designed and compact structural unit, and which at the same time is capable of fulfilling the functions of compensating for weight, of locking and of securing the drawing-table against a sudden drop.

According to the present invention these and other objects are accomplished in that securing means preventing rapid inward movement of the piston rod (hereinafter referred to as piston rod drop preventing means) are associated with the piston rod, the piston rod drop preventing means including a connection line (connecting passage-compensating channel) between the cylinder cavity and the second liquid chamber, the connection line being provided with a pressure responsive valve means responding to an excess of a predetermined pressure differential between the cylinder cavity and the second liquid chamber. By using such piston rod drop preventing means, an installation is provided which has not only a good and simple design, but which also excludes danger to the user in a simple, yet reliable, manner.

According to a further feature of the present invention, the pressure-differential responsive piston rod drop preventing means and the externally controlled locking valve are series-connected in the connection line extending between the cylinder cavity and the second liquid chamber. Thus it is achieved in a simple manner that, in the presence of an excess pressure differential between the cylinder cavity and the second liquid chamber, the flow of the liquid from the cylinder cavity into the second liquid chamber is prevented on operation of the valve stem associated with the locking valve.

According to one embodiment of the present invention, the piston rod drop preventing means include a piston valve upon one side of which acts the pressure of the cylinder cavity and upon the other side thereof acts the pressure of the second liquid chamber, with the piston valve being subjected to the action of a biassing spring (piston valve spring) and a valve disc being connected to the piston valve. The separating piston, therefore, is continuously subjected to the pressure in the cylinder cavity and also to the pressure of the second liquid chamber. The valve means operated by the separating piston closes the passage between the cylinder cavity and the second liquid chamber in the presence of an excessive pressure differential. In case of an excessive pressure differential between the liquid-filled chambers, the flow of liquid from the cylinder cavity into the second liquid chamber, and thus a rapid inward movement of the piston rod, is prevented when the locking valve is opened.

According to a further feature of the present invention, it is of great advantage to locate the piston rod drop preventing means between an externally controlled valve stem and the locking valve (valve disc, valve ball). This feature is the basis of a further simplification over the prior art, which resides in that the piston rod drop preventing means are comprised of a resilient member mounted on the valve stem opposite to the locking valve.

A construction which is simple in design is provided in accordance with the present invention in that the resilient member is a sliding sleeve which is loaded by a compression spring, the sliding sleeve axially abutting an abutment head of the valve stem and defining an abutment face for a biassed pressure spring. According to a further feature of the present invention, the locking valve can be a biassed valve plate or a ball valve. In the latter case, the sliding sleeve can have a centering means for the valve ball at the end facing the valve ball.

According to another feature of the invention, the piston rod drop preventing means comprises a spring-loaded valve (valve disc, pressure spring) which is arranged in parallel to the locking valve.

In the presence of excessive pressure in the cylinder cavity as compared to the pressure in the second fluid chamber, the spring-loaded valve opens so as to prevent a difference in pressure between the two chambers which is greater than the predetermined value. In order to prevent a rapid downward movement of the vertically adjustable drawing-table in case of a sudden overload, a throttle section is series-connected to the spring-loaded valve upstream of the valve.

In order to permit an easy adjustment of the permissible pressure differential, the piston rod drop preventing means include adjusting means for a continuous change of the bias of the spring. This adjusting means can comprise a spring disc which is connected through a thread to the valve stem and is drivingly connected to, but axially displaceable in, a stationary portion of the installation.

The invention is explained below in detail on the basis of the illustrative embodiments shown in the drawings.

DETAILED DESCRIPTION

Figure 1:
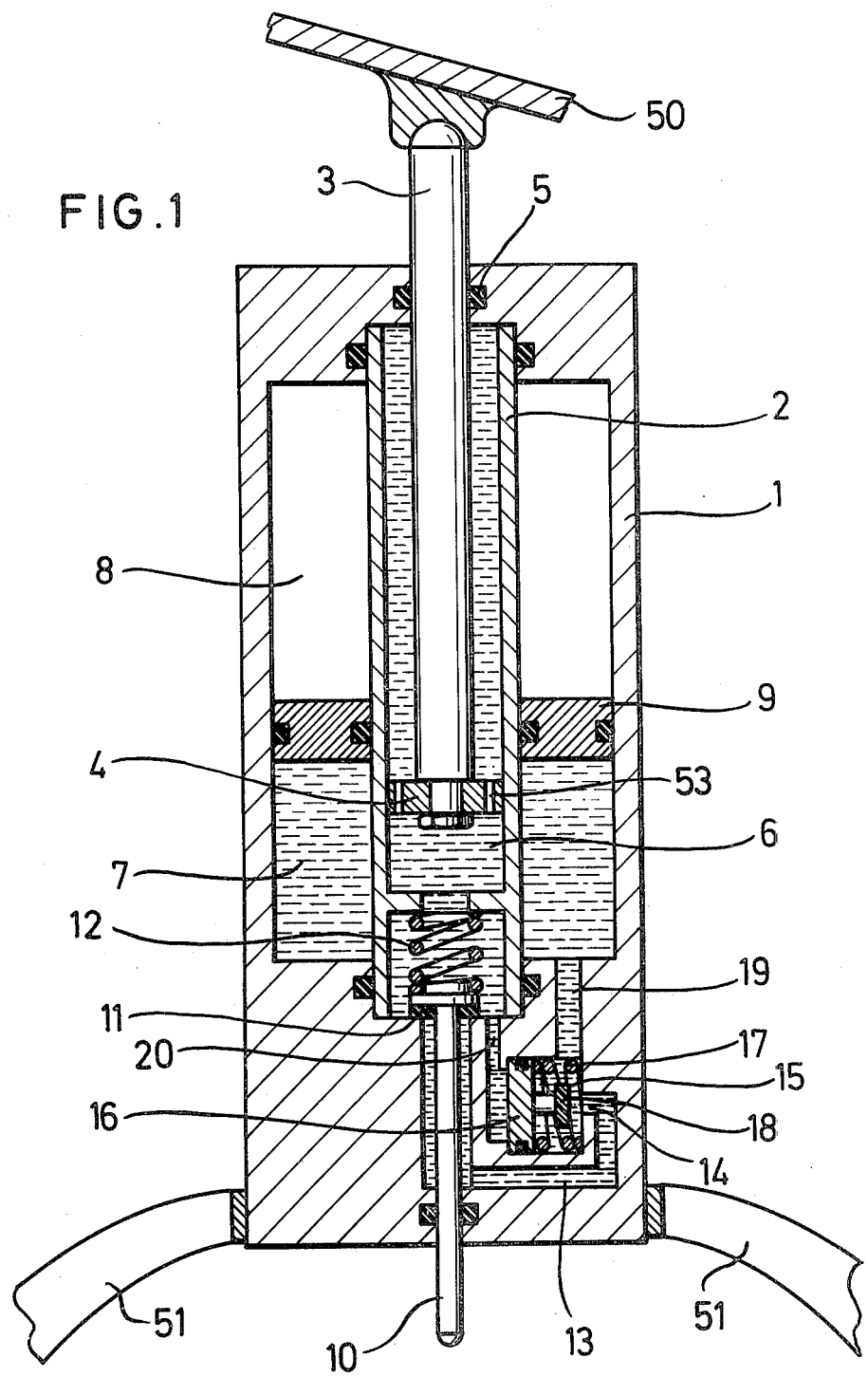
FIG. 1 shows a longitudinal section of a gas spring of the invention, in which the piston rod drop preventing means comprise a separating piston.

The schematically shown lockable spring according to FIG. 1 comprises the pressure vessel 1 in which the cylinder 2 is fixed and sealed. The lower end of the piston rod 3 carries the piston 4, which is provided with connection bores 53. The piston rod 3 is sealingly guided through the upper end of the vessel 1 by a sealing member 5. The cylinder cavity 6 is completely filled with liquid, while the annular chamber defined by the outer wall of the cylinder 2 and the inner wall of the vessel 1 has a second liquid chamber 7 and a gas chamber 8 filled with pressurized gas. In this embodiment, the second liquid chamber 7 is separated from the gas chamber 8 by the separating piston 9. The valve stem 10 extends outward from the lower end of the vessel 1. The valve stem 10 carries the locking valve 11 and is loaded by the valve spring 12. In the illustrated position of the locking valve 11, the locking valve is closed and the flow of liquid from the cavity 6 to the second liquid chamber 7 through the connecting passage 13, the valve chamber 15, and the connecting passage 19 is interrupted. The valve chamber 15 is located within the liquid path between the cylinder cavity 6 and the second liquid chamber 7. In this valve chamber 15 is located the valve piston 16 which is loaded by the valve piston spring 17 and which carries the valve disc 18. Upon one side of the piston 16 acts the pressure in the cylinder cavity 6 through the pressure channel 20, while upon the other side of the piston 16 is exerted the pressure of the second fluid chamber 7 through the connecting passage 19. The opening 14 of the connecting passage 13 into the valve chamber 15 is open in the position of the valve disc 18 shown in the drawing.

In the position of the valve disc 18 as shown in FIG. 1, liquid can flow from the cylinder cavity 6 through the connecting passage 13, the valve chamber 15, and the connecting passage 19 into the second fluid chamber 7 when the locking valve 11 is open, so that the piston rod 3 can move downward into the cylinder 2. The pressure in the gas chamber 8 is selected so that the weight of the drawing-table 50 acting on the piston rod 3 is substantially compensated for when the locking valve 11 is opened by manual operation of the valve stem 10. In this balanced weight position, a small force suffices to vertically adjust the drawing-table 50 vertically as desired when the locking valve 11 is opened. When the valve stem 10 is released again and the locking valve 11 is pressed onto the valve seat by the valve spring 12, the new position of the drawing-table 50 is hydraulically fixed. The piston rod 3 is then hydraulically locked in its new position so that it cannot move any further. It depends on the ratio of the weight of the drawing-table 50 and the pressure of the gas in the gas chamber 8 whether upon opening the locking valve 11 a small downwardly directed external force is required to adjust the drawing-table 50 in the downward direction or a small upwardly directed force is required to adjust the drawing-table 50 in upward direction.

When the weight acting on the piston rod 3 is substantially increased by depositing a heavy object on the drawing-table 50, or when by loss of gas the pressure in the gas chamber 8 is substantially reduced, there is the risk that the drawing-table 50 might drop rapidly in response to opening the locking valve 11. In such a case, however, there is a pressure difference between the cylinder cavity 6 and the second liquid chamber 7. When the pressure difference between the chambers 6 and 7 exceeds a predetermined value, the piston 16 in the valve chamber 15 slides against the force of the valve piston spring 17 and closes the opening 14 of the connecting passage 13 by means of the valve disc 18. As a consequence, the flow of liquid from the cylinder cavity 6 into the second liquid chamber 7 is prevented (even though the locking valve 11 is opened) due to the action of the piston rod drop preventing means, which include the piston 16, the valve disc 18, and the valve piston spring 17. The piston rod 3 remains locked and cannot drop all of a sudden in spite of the increased weight of the drawing-table 50. It can be seen from the above that the force of the valve piston spring 17 is determinative of the amount of overpressure in the cylinder cavity 6 which is considered permissible as compared to the pressure in the second fluid chamber 7. In such a case vertical adjustment of the drawing-table 50 is, however, still possible when a lifting force is exerted on the drawing-table 50, so that the pressure in the cylinder cavity 6 decreases and the piston rod drop preventing means (which comprise the piston 16, the valve piston spring 17, and the valve disc 18) return into the shown position. If the weight of the drawing-table 50 is permanently increased by additional appliances that are to remain on the table, the normal mode of operation of the gas spring can be restored by increasing the gas pressure in the gas chamber 8 accordingly. To this aim, a filling valve (not shown) is provided in connection with the gas chamber 8. The legs 51 of the drawing-table 50 are diagrammatically shown in FIG. 1.

Figure 2:
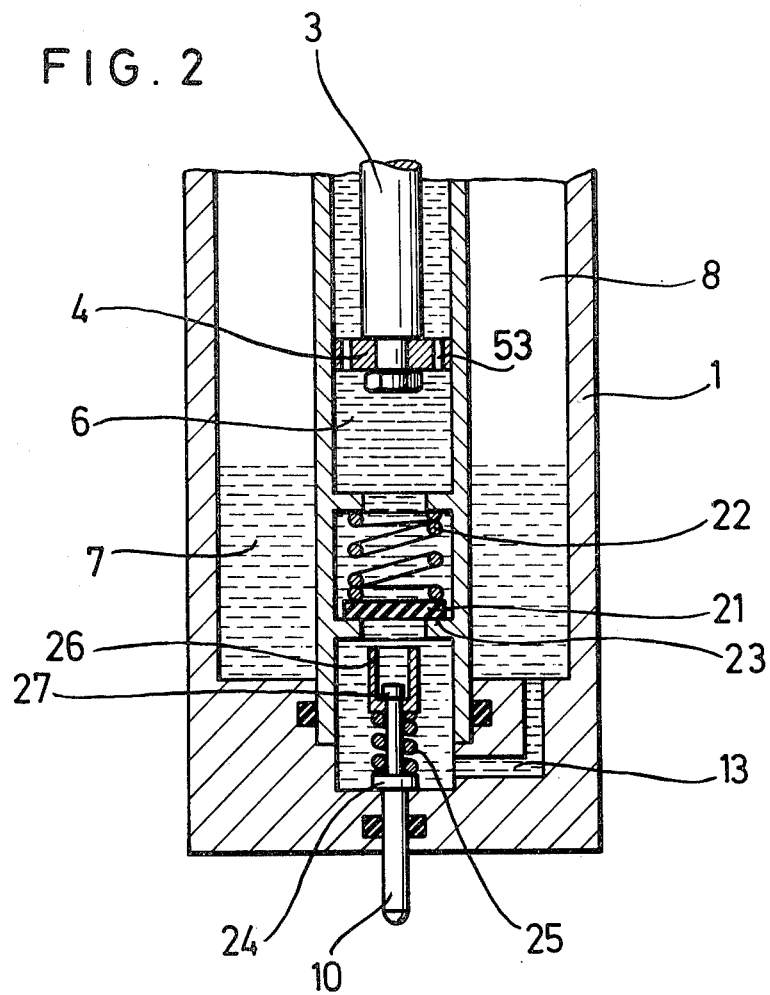
FIG. 2 shows a modified embodiment with the piston rod drop preventing means being arranged between the locking valve and the operating stem.

The embodiment illustrated in FIG. 2 differs from that shown in FIG. 1 by the arrangement and design of the piston rod drop preventing means. In this embodiment, there is provided a sliding sleeve 26 on the upper section of the valve stem 10, which sliding sleeve 26 is loaded by the pressure spring 25. The valve stem 10 includes an abutment disc 24 which provides a lower abutment face for the pressure spring 25, whereas the sliding sleeve 26 defines an upper abutment face for the pressure spring 25. Upward movement of the sliding sleeve 26 is limited by an abutment head 27 of the valve stem 10. The bias of the pressure spring 25 is decisive of the difference in pressure between the cylinder cavity 6 and the second fluid chamber 7 at which the piston rod drop preventing means become effective. In the absence of a difference in pressure or in the presence of a small difference in pressure between the cylinder cavity 6 and the second fluid chamber 7, the manually controlled upward movement of the valve stem 10 has the effect that the upper end of the sleeve 26 lifts the valve disc 21 from the valve seat 23 against the small force of the valve spring 22 and a fluid exchange can take place via the connecting passage 13 between the chambers 6 and 7. The piston rod 3 provided with the piston 4 can then be moved into the desired position. Thereupon, the valve stem 10 is released and moves into the shown position so that the valve disc 21 again engages the valve seat 23 and effects the hydraulic locking. When the pressure in the cylinder cavity 6 exceeds the pressure in the second fluid chamber 7 by a predetermined pressure differential, as determined by the bias of spring 25, the valve disc 21 is pressed against the valve seat 23 with such a force that on manually controlled upward movement of the valve stem 10, the sliding sleeve 26 is axially displaced with respect to the valve stem 10 against the force of the pressure spring 25 to thereby prevent an opening of the locking valve defined by the valve disc 21. The mode of operation is thus similar to that described in connection with the embodiment of FIG. 1.

Figure 3:
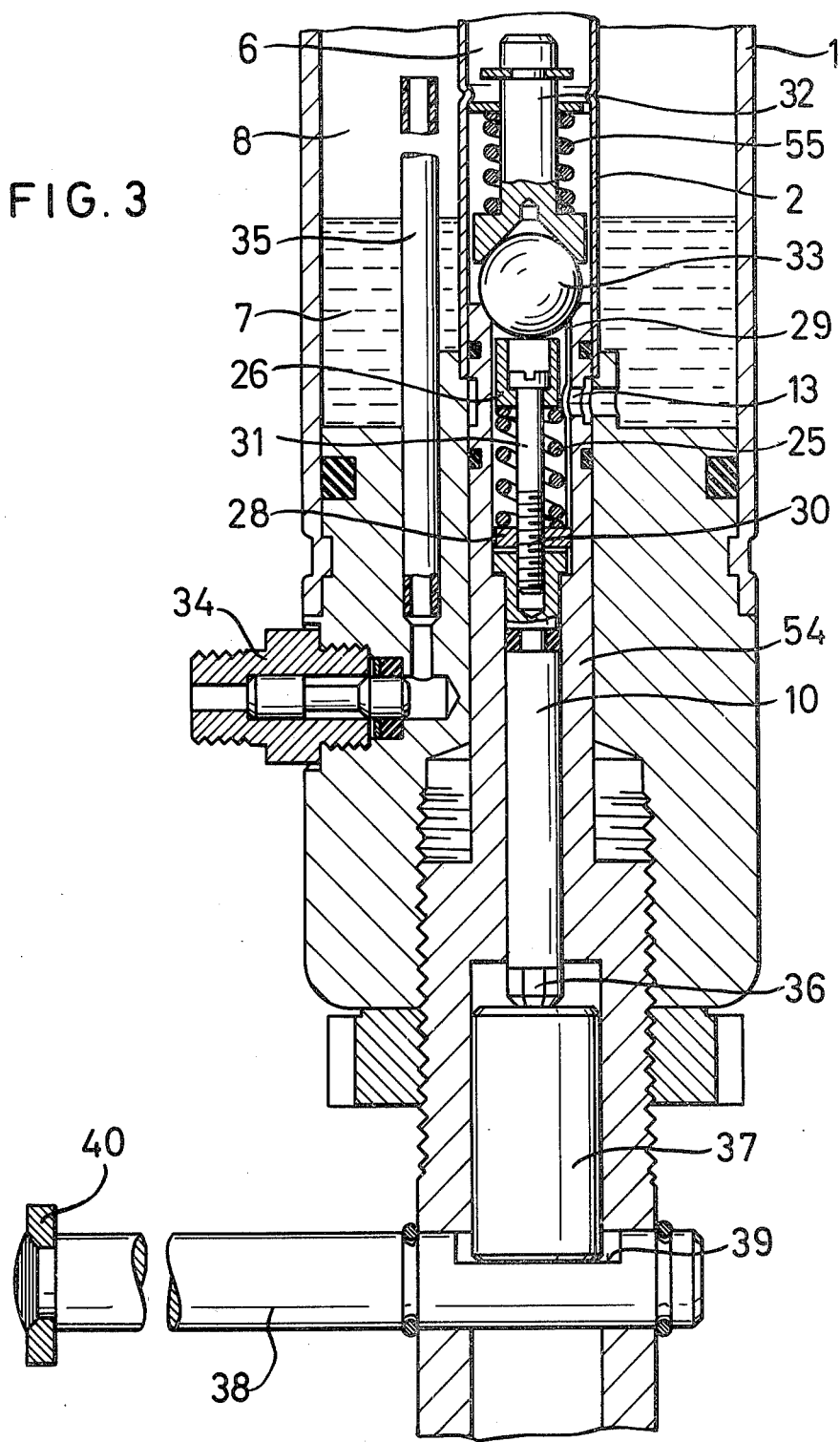
FIG. 3 shows a further modified embodiment in which the piston rod drop preventing means include a spring-loaded sleeve cooperating with a valve ball of the locking valve.

FIG. 3 shows a lockable gas spring in which the piston rod 3 and the piston 4 housed within the upper part of the cylinder 2 are not shown. This device includes a locking valve in the form of a valve ball 33. In this embodiment, the piston rod drop preventing means also comprise the sliding sleeve 26 which is loaded by the pressure spring 25 and which is mounted on the screw bolt 31, the screw bolt 31 being fixed to the valve stem 10. The screw bolt 31 is provided with a thread 30 which is in threaded engagement with the spring supporting disc 28 for the pressure spring 25. A radially outward directed projection of the spring supporting disc 28 engages an axial groove 29 of a tubular member 54 attached to the vessel 1. By turning the valve stem 10, the axial position of the spring supporting disc 28, and thereby the bias of the pressure spring 25, can be varied. To this end, the valve stem 10 is provided with turning tool engagement faces 36 at the lower end thereof. So, the piston rod drop preventing means can be easily adjusted to the desired pressure differential between the cylinder cavity 6 and the second liquid chamber 8. In order to guarantee perfect operation of the locking valve, a ball guiding member 32 is provided which acts upon the valve ball 33 under the action of a weak pressure spring 55. For adjusting the gas pressure within the gas chamber 8, a filling valve 34 is provided which communicates with the gas chamber 8 through a filling tube 35.

The locking valve 33 is operated by a foot lever 40 which is provided at one end of an operating shaft 38. This operating shaft 38 is rotatably mounted within a transverse bar of the tubular member 54. The shaft 38 is provided with a cam face 39 which, on rotation of the operating shaft 38, causes an axial movement of a pin 37 and thus also of the valve stem 10. When the pressures in the cylinder cavity 6 and in the second liquid chamber 7 are balanced, the sliding sleeve 26 can lift the valve ball 33 to permit the flow of liquid between the cylinder cavity 6 and the second liquid chamber 7. A small force suffices to move the drawing-table 50 into the desired position, which position is thereafter fixed by closing the locking valve 33. However, in the presence of excessive pressure in the cylinder cavity 6 as compared to the pressure in the second liquid chamber 7, the piston rod drop preventing means become operative on actuation of the foot lever 40. The sliding sleeve 26 then slides against the force of the spring 25 on the screw bolt 31 as the force exerted on the valve ball 33 by the pressure differential exceeds the force of the spring 25. In order to rebalance the pressures in the second liquid chamber 7 and in the cylinder cavity 6, gas must be pumped into the gas chamber 8 via the filling valve 34 and the filling tube 35.

Figure 4:
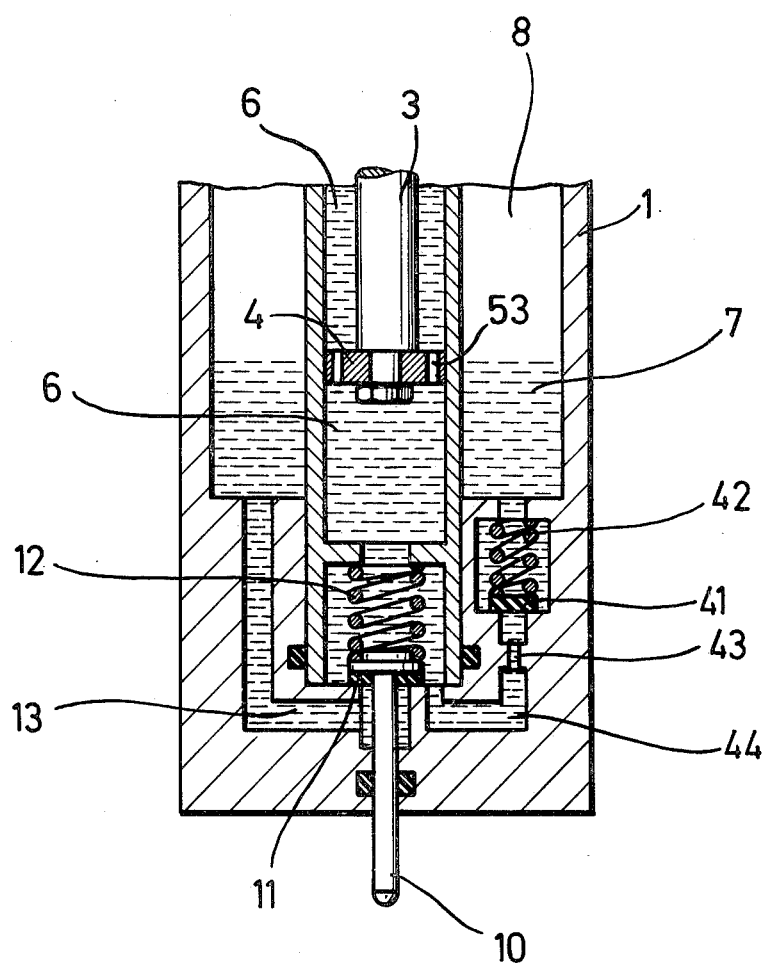
FIG. 4 shows the piston rod drop preventing means in parallelism with the locking valve.

In the embodiment illustrated in FIG. 4, the cylinder cavity 6 is connected to the second liquid chamber 7 through the connecting passage 13 which can be opened and closed by an externally operable valve assembly, including the valve stem 10, the locking valve 11, and the valve spring 12. A compensating channel 44 is provided parallel to the connecting passage 13. This compensating channel 44 comprises a throttled section 43 and a valve 41, 42 comprised of a valve disc 41 and a pressure spring 42. If a pressure differential occurs between the cylinder cavity 6 and the second liquid chamber 7 which exceeds a predetermined value, the valve disc 41 is lifted against the force of the pressure spring 42 so that the pressure differential can be slowly balanced via the throttled section 43. In this embodiment, the drawing-table 50 is automatically lowered in case of an overload of the drawing-table 50 or in case of a pressure drop in the gas chamber 8, until the pressure differential is reduced below the predetermined value defined by the force of the pressure spring 42. Also in this case, a rapid downward movement of the drawing-table 50 is prevented due to the damping effect of the throttled section 43.

Although the invention has been described herein by reference to specific embodiments thereof, it will be understood that such embodiments are susceptible of variation and modification without departing from the inventive concepts therein. All such variations and modifications, therefore, are intended to be encompassed within the spirit and scope of the appended claims.

What is claimed is:

1. In a hydraulically lockable gas spring for continuous height adjustment of an object, in particular of drawing-tables, including hydrauylic locking means comprising a liquid-filled cylinder, a piston rod sealingly guided for movement inward and outward of said cylinder, a piston carried by said piston rod within said cylinder, said piston rod being connected to said object, the cavity of said cylinder being connected to a second liquid chamber via an externally controlled locking valve, and said second liquid chamber being subjected to the pressure of a pressurized gas contained in a gas chamber, the improvement comprising:

piston rod drop preventing means associated with said piston rod, comprising a liquid connection line between said cylinder cavity and said second liquid chamber, and pressure responsive valve means responsive to an excess of a predetermined pressure differential between said cylinder cavity and said second liquid chamber for controlling liquid flow through said connection line so as to prevent the sudden dropping of said piston rod, said pressure responsive valve means comprising a piston valve acted upon on one side by the pressure of the cylinder cavity and upon the other side by the pressure of the second fluid chamber, a biassing spring acting on said piston valve in opposition to the pressure within said cylinder cavity, and a valve disc connected to said piston valve to close said connecting line in the presence of said excess pressure differential.

2. The spring of claim 1 wherein the pressure-differential responsive piston rod drop preventing means and the externally controlled locking valve are serially arranged in the connecting line extending between the cylinder cavity and the second liquid chamber.

3. The spring of claim 1 wherein said piston rod drop preventing means are located between an externally controlled valve stem and the locking valve.

4. The spring of claim 1 wherein said piston rod drop preventing means comprise a resilient member which is mounted on a valve stem opposite to the locking valve.

5. The spring of claim 4 wherein said resilient member comprises a sliding sleeve which is biassed by a pressure spring, said sliding sleeve axially abutting an abutment head of said valve stem and defining an abutment face for said pressure spring.

6. The spring of any one of the claims 1, 2, 3, 4 and 5 wherein said locking valve comprises a biassed valve plate.

7. The spring of claim 5 wherein said locking valve is a ball valve and the end of the sliding sleeve which faces the valve ball defines a centering means for the valve ball.

8. The spring of claim 1 wherein said pressure responsive valve means include a spring-loaded valve which is arranged in parallel to the locking valve.

9. The spring of claim 8 wherein a throttle section is arranged in said connection line upstream of said spring-loaded valve.

10. The spring of claim 1 wherein said pressure responsive valve means include a sring-loaded valve and said piston rod drop preventing means include adjusting means for adjustment of the bias of said spring.

11. The spring of claim 10 wherein said adjusting means comprises a spring disc which is threadably connected to the valve stem and is drivingly connected to, but axially displaceable in, a stationary portion of the installation.

* * * * *

UNITED STATES PATENT AND TRADEMARK OFFICE
CERTIFICATE OF CORRECTION

PATENT NO. : 4,445,671

DATED : May 1, 1984

INVENTOR(S) : Reuschenbach et al.

It is certified that error appears in the above-identified patent and that said Letters Patent is hereby corrected as shown below:

Column 4, line 12, after "to" delete "vertically";

Column 6, line 57, "hydrauylic" should read --hydraulic--;

Column 8, line 20, "sring-loaded" should read --spring-loaded--.

Signed and Sealed this

Second Day of October 1984

[SEAL]

Attest:

GERALD J. MOSSINGHOFF

Attesting Officer   Commissioner of Patents and Trademarks